US010124775B2

United States Patent
Svensson et al.

(10) Patent No.: US 10,124,775 B2
(45) Date of Patent: Nov. 13, 2018

(54) METHOD AND DEVICE FOR OPERATING A VEHICLE WHICH IS CAPABLE OF AUTONOMOUS DRIVING

(71) Applicant: FORD GLOBAL TECHNOLOGIES, LLC, Dearborn, MI (US)

(72) Inventors: Thomas Svensson, Lichlingen (DE); Timothy Jurkiw, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 15/160,892

(22) Filed: May 20, 2016

(65) Prior Publication Data

US 2016/0339880 A1    Nov. 24, 2016

(30) Foreign Application Priority Data

May 22, 2015    (DE) .................. 10 2015 209 431

(51) Int. Cl.
*B60T 7/22*    (2006.01)
*B60W 40/08*    (2012.01)

(52) U.S. Cl.
CPC .............. *B60T 7/22* (2013.01); *B60W 40/08* (2013.01); *B60T 2201/022* (2013.01); *B60W 2040/0818* (2013.01); *B60W 2510/202* (2013.01); *B60W 2540/106* (2013.01); *B60W 2540/12* (2013.01); *B60W 2550/10* (2013.01); *B60W 2710/18* (2013.01)

(58) Field of Classification Search
None
See application file for complete search history.

(56) References Cited

U.S. PATENT DOCUMENTS

| 6,084,508 | A | 7/2000 | Mai et al. |
|---|---|---|---|
| 6,131,063 | A | 10/2000 | Seki et al. |
| 8,280,623 | B2 | 10/2012 | Trepagnier et al. |
| 8,352,110 | B1 | 1/2013 | Szybalski et al. |
| 2014/0005875 | A1 | 1/2014 | Hartmann et al. |
| 2016/0046266 | A1* | 2/2016 | Hammoud ................ B60T 7/22 701/70 |
| 2017/0210367 | A1* | 7/2017 | Baneu ..................... B60T 8/74 |

FOREIGN PATENT DOCUMENTS

| DE | 10132386 A1 | 1/2003 |
|---|---|---|
| DE | 102012112802 A1 | 6/2014 |
| JP | H1024818 A | 1/1998 |
| JP | 2004203387 A | 7/2004 |

* cited by examiner

*Primary Examiner* — Mussa A Shaawat
*Assistant Examiner* — Kyung J Kim
(74) *Attorney, Agent, or Firm* — Frank MacKenzie; Brooks Kushman P.C.

(57) ABSTRACT

The disclosure relates to a method for operating a motor vehicle which is capable of driving either under the control of a human driver who is located on board the motor vehicle or autonomously, at least over certain sections of a route, and which is able to avoid collisions, detect adverse effects on the driver and bring about emergency stops. Accordingly, the motor vehicle has an emergency braking assistant, and if an adverse effect on the driver is detected in the autonomous driving mode, a characteristic curve which is preset for emergency braking operations is changed in such a way that an emergency braking operation is initiated at an earlier point and the braking force is built up more slowly than in the non-autonomous driving mode.

11 Claims, 3 Drawing Sheets

_METHOD AND DEVICE FOR OPERATING A VEHICLE WHICH IS CAPABLE OF AUTONOMOUS DRIVING_

CROSS-REFERENCE TO RELATED APPLICATION

This application claims foreign priority benefits under 35 U.S.C. § 119(a)-(d) to DE 10 2015 209 431.6, filed May 22, 2015, which is hereby incorporated by reference in its entirety.

TECHNICAL FIELD

The invention relates to a method and a device for operating a motor vehicle which is capable of driving either under the control of a human driver who is located on board the motor vehicle or autonomously, at least over certain sections of a route, and which is able to avoid collisions, detect adverse effects on the driver and bring about emergency stops, according to the preambles of the independent patent claims.

BACKGROUND

Such a motor vehicle is known from U.S. Pat. No. 8,280,623 B2. The vehicle can assume control if an obstacle suddenly appears or if the driver is overtaxed by a driving situation or physically incapable of controlling the vehicle. An adverse effect on the driver can be detected by virtue of the fact that the vehicle has a left a predetermined path and also the steering wheel or pedals have not been activated for a relatively long time. The vehicle can also bring about an emergency stop, wherein the vehicle is brought to a standstill under autonomous control. This obviously takes place rather slowly and not with the maximum braking force as in the case of a genuine emergency braking operation.

U.S. Pat. No. 8,352,110 B2 discloses a motor vehicle which is capable of autonomous driving and which detects adverse effects on the driver while he is driving the vehicle, on the basis of signals of contact sensors on the steering wheel, and if appropriate assumes control of the steering wheel.

Contemporary motor vehicles are frequently equipped with an emergency braking assistant which detects obstacles and which, if the distance from an obstacle becomes too small without the driver correspondingly reacting, triggers full braking in order to avoid a collision with the obstacle, or at least to reduce the severity of the impact. As a result, an emergency braking assistant differs from a braking assistant which merely constitutes a brake booster which is part of the area of responsibility of the vehicle driver, and also from an emergency stop device for terminating travel in the event of an adverse effect on the driver which unexpectedly occurs.

An emergency braking assistant can be implemented using a conventional vacuum brake system which uses a pump in the brake module, said pump being used for a vehicle movement dynamics controller (electronic stability control; ESC) or anti-lock brake system (ABS), in order to actuate the brakes independently of activation of the brake pedal by the driver.

An emergency braking assistant builds up the braking force or the brake pressure along a preset characteristic curve as a function of time which passes from a partial braking operation to a full braking operation. This characteristic curve is often a ramp function which rises with an approximately constant gradient from zero to a maximum value and maintains said maximum value for a certain time. The characteristic curve for the braking force or brake pressure for an emergency braking operation is preset in such a way that it matches a driver who is normally in control of the vehicle.

The invention is based on the object of being able to provide a motor vehicle which is capable of autonomous driving with an emergency braking assistant.

SUMMARY

This object is achieved by means of a method and a device having the features of the independent patent claims.

Advantageous developments of the invention are specified in the dependent patent claims.

The invention is based on the realization that a known emergency braking assistant cannot be simply installed as it is an autonomous motor vehicle. It may, in fact, be the fact that owing to his trust in the autonomous driving capability of the vehicle, its driver is in control of said vehicle much less than would be allowed in any non-autonomous vehicle, even in vehicles with an emergency braking assistant and/or another driving assistant such as, for example, adaptive cruise controllers. Therefore, the capability of the driver to engage could in some way be very adversely affected, for example he could be sleepy or asleep or, for example, be occupied with a mobile communication device. In this case, full braking, even if initiated with partial braking, could shock the driver to such an extent that he reacts in an extremely inappropriate way by, for example, depressing the accelerator pedal or the brake pedal, or the driver could, for example, impact against the steering wheel.

According to the invention, if an adverse effect on the driver is detected in the autonomous driving mode, a characteristic curve which is preset for emergency braking operations is changed in such a way that an emergency braking operation is initiated at an earlier point and the braking force is built up more slowly than in the non-autonomous driving mode.

The emergency braking operation is preferably initiated at such an early point that a collision is avoided as reliably as in the non-autonomous driving mode. However, even if collision damage is only reduced, this can be better than if the driver is physically injured, as can occur as a result of an inappropriate reaction or an impact against the steering wheel.

The term "autonomous driving" as used here comprises both fully autonomous driving, wherein a vehicle drives fully automatically from a starting point to a destination, and semi-autonomous driving, for example travel in which the vehicle drives autonomously only in certain phases. In any case, the invention is provided for vehicles in which the driver's seat is normally occupied and the driver can assume control of the vehicle at any time, but where it is not ruled out that the driver gets up from the driver's seat or leans to the side during travel.

Adverse effects on the driver are understood here to be only those which prevent him being able to assume control of the vehicle at any time.

The invention can be applied not only in vacuum brake systems but also in so-called brake-by-wire brake systems in which an electromechanical device such as, for example, a piston pump or an electropneumatic device builds up the necessary brake pressure.

In the case of brake-by-wire brake systems, the invention can be implemented particularly well if the control of the brake pressure can take place in a particularly finely graduated and variable fashion here, and because the inventive temporary changing of the braking characteristic curve for emergency braking operation can easily be carried out in the software here.

In one preferred embodiment, the characteristic curves according to which emergency braking operations are carried out are a first characteristic curve for normal emergency braking operations, and a second characteristic curve for emergency braking operations in the autonomous driving mode when the driver is adversely affected. In this context, an emergency braking operation can in each case have a partial braking phase and a full braking phase, wherein the partial braking phase of the second characteristic curve is longer than that of the first characteristic curve. Both of the characteristic curves are preferably ramp functions.

In one preferred embodiment, adverse effects on the driver are detected on the basis of indices which are acquired by means of sensors which sense movements of the steering wheel, accelerator pedal and/or brake pedal and/or forces applied thereto. As long as the driver is not distracted very much, he will ensure that he does not touch the steering wheel, accelerator pedal and/or brake pedal in the autonomous driving mode.

If the torque which is applied to the steering wheel by the driver and/or the duration thereof reach or exceed preset absolute or time-based steering wheel-torque threshold values, this can be an index for an adverse effect on the driver.

If the rate of change and/or duration of activation operations on an accelerator pedal or brake pedal reach or exceed absolute or time-based preset threshold values for the rate of change of actuation and duration of pedal activation operations, these can also be indices for an adverse effect on the driver.

Through suitable selection of the threshold values and the evaluation logic it is possible to assess relatively reliably whether the driver who is being monitored with the specified sensor system is currently in a state in which he is adversely affected or not.

Sensors for monitoring driver inputs at the steering wheel, accelerator pedal and brake pedal are often already present or even necessarily present in contemporary motor vehicles, with the result that the invention can be implemented at particularly low cost.

Operator control elements other than the steering wheel, accelerator pedal and brake pedal or additional operator control elements can also be included in the acquisition of indices.

As an alternative or in addition to actuation sensors, for example on the steering wheel, accelerator pedal and/or brake pedal it is possible also to use other methods to detect adverse effects on the driver, for example the evaluation of camera images of a camera directed at the driver in the passenger compartment of the vehicle.

There follows a description of exemplary embodiments with reference to drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
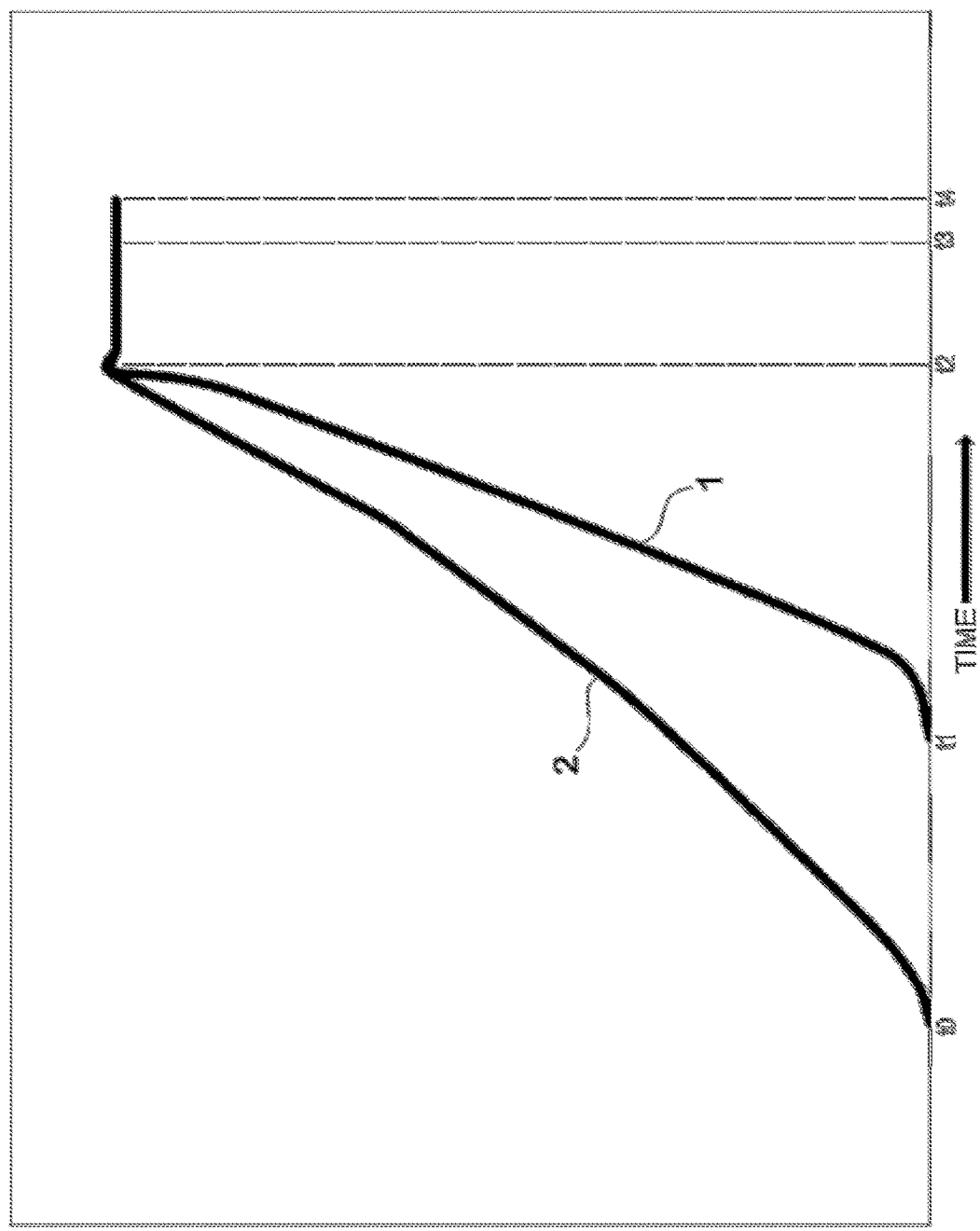
FIG. 1 shows an emergency braking characteristic curve for the non-autonomous driving mode and an emergency braking characteristic curve for the autonomous driving mode.

A motor vehicle emergency braking assistant detects the distance of the vehicle from obstacles via radar sensor or lidar sensor. If a critical situation is detected, at a time t1 in FIG. 1 a partial braking operation is firstly initiated, wherein the brake pressure in the brake system rises approximately linearly from zero to a maximum value which is reached at a time t2. During the partial braking phase, the driver still has the possibility of assuming control again, whether by means of an avoidance maneuver or braking. The time t2 is the latest time at which a collision with the obstacle can still be avoided. Accordingly, at the time t2 a full braking operation with maximum brake pressure is carried out, and at a time t4 the vehicle comes to a standstill, ideally just before the obstacle.

The brake pressure therefore follows a ramp function which is a first characteristic curve 1 which is preset for normal emergency braking operations. The first characteristic curve 1 is applied both when the vehicle is not driving autonomously and when said vehicle is driving autonomously or semi-autonomously with a driver seated on the driver's seat and the capability of the driver to engage is not adversely affected, i.e. he can assume control of the vehicle at any time.

During operation, it is continuously monitored whether the capability of the driver to engage is adversely affected and if there are indices that this is the case, the brake pressure follows, in the case of an emergency braking operation, a second characteristic curve 2, which is also a ramp function which likewise ends for normal emergency braking operations at the time t2 but begins earlier than at the time t1 for normal emergency braking operations, specifically at a time t0, wherein in the partial braking phase which extends from t0 to t2 the brake pressure rises more slowly to the maximum value than in the case of the first characteristic curve 1 for normal emergency braking operations. The vehicle comes to a standstill at a time t3, which is chronologically somewhat before the time t4. Accordingly, the second characteristic curve 2 in FIG. 1 could also be shifted in its entirety somewhat to the right, without there being a collision.

Figure 2:
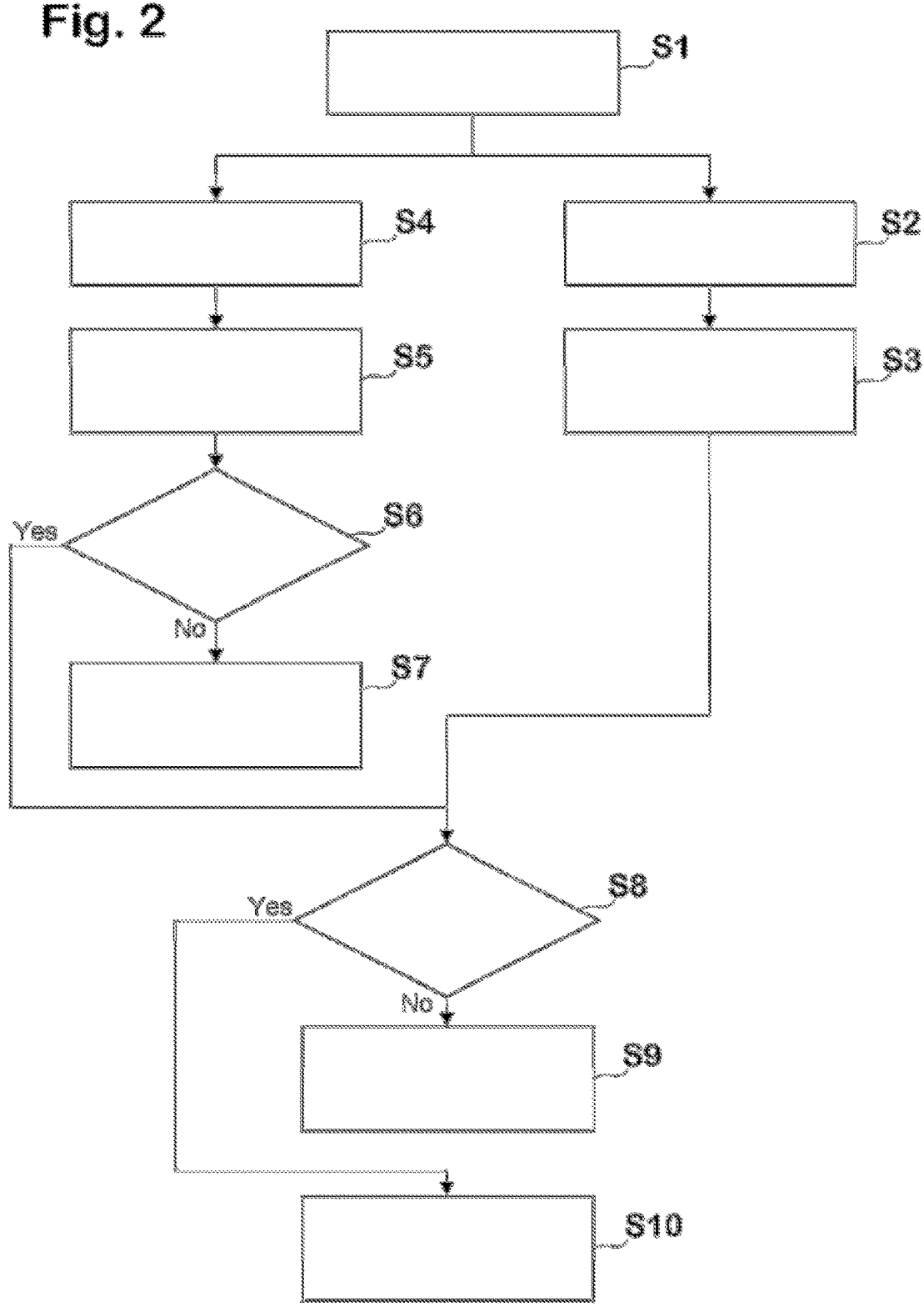
FIG. 2 shows a flow chart explaining the method of operation of an emergency braking assistant in a vehicle which is driving in an autonomous fashion.

The method of operation of the emergency braking assistant in the case of a vehicle which is driving autonomously will now be explained in more detail with respect to FIG. 2.

The motor vehicle has actuation sensors or force sensors on the steering wheel, accelerator pedal and brake pedal.

In step S1, it is continuously determined whether there is an obstacle in the driving path which will possibly make an emergency braking operation necessary in the near future. If this is the case, in step S2 the distance from the obstacle is monitored and in step S3 the chronological distance from the obstacle is compared with a time threshold value which is preset for a driver who is adversely affected.

In parallel with the steps S2 and S3, in step S4 the torque which is applied to the steering wheel and the actuations of the accelerator pedal and the brake pedal are monitored, and in step S5 the torque which is applied to the steering wheel by the driver and the duration thereof are compared with preset steering wheel torque threshold values, the rate of change and duration of activation operations of the accelerator pedal are compared with preset threshold values for the rate of change of the actuation and duration of actuation operations of the accelerator pedal, and the rate of change and duration of activation operations of the brake pedal are compared with preset threshold values for the rate of change of the actuation and duration of activation operations of the brake pedal.

The corresponding threshold values may be relatively small. There can be provision that the autonomous automatic driving system can be switched off by specific relatively intensive steering wheel activation operations or pedal activation operations, as a result of which the driver can assume full control of the vehicle again.

If the driver applies a torque of greater intensity or duration than the corresponding threshold values to the steering wheel or if said driver activates the accelerator pedal or brake pedal more quickly or for longer than the corresponding threshold values, in step S6 it is decided that the driver is in a state in which he is adversely affected because he is, for example, sleepy, asleep or distracted.

If the driver is not in a state in which he is adversely affected because none of the specified threshold values is exceeded, in step S7 the first characteristic curve 1 which is preset for normal emergency braking operations is selected.

If the driver is in a state in which he is adversely affected and if in step S3 an excessively short chronological distance from the obstacle was also detected, in step S8 it is checked whether the time determined in step S3 until the obstacle is reached is below the time threshold value which was preset for a driver who is adversely affected. If this is not the case, in step S9 the second characteristic curve 2 which is preset for a driver who is adversely affected is selected, and the vehicle is brought to a standstill in accordance with the second characteristic curve 2. If this is the case, in step S10 the first characteristic curve 1 which is preset for normal emergency braking operations is selected and the vehicle is brought to a standstill in accordance with the characteristic curve 1.

Figure 3:
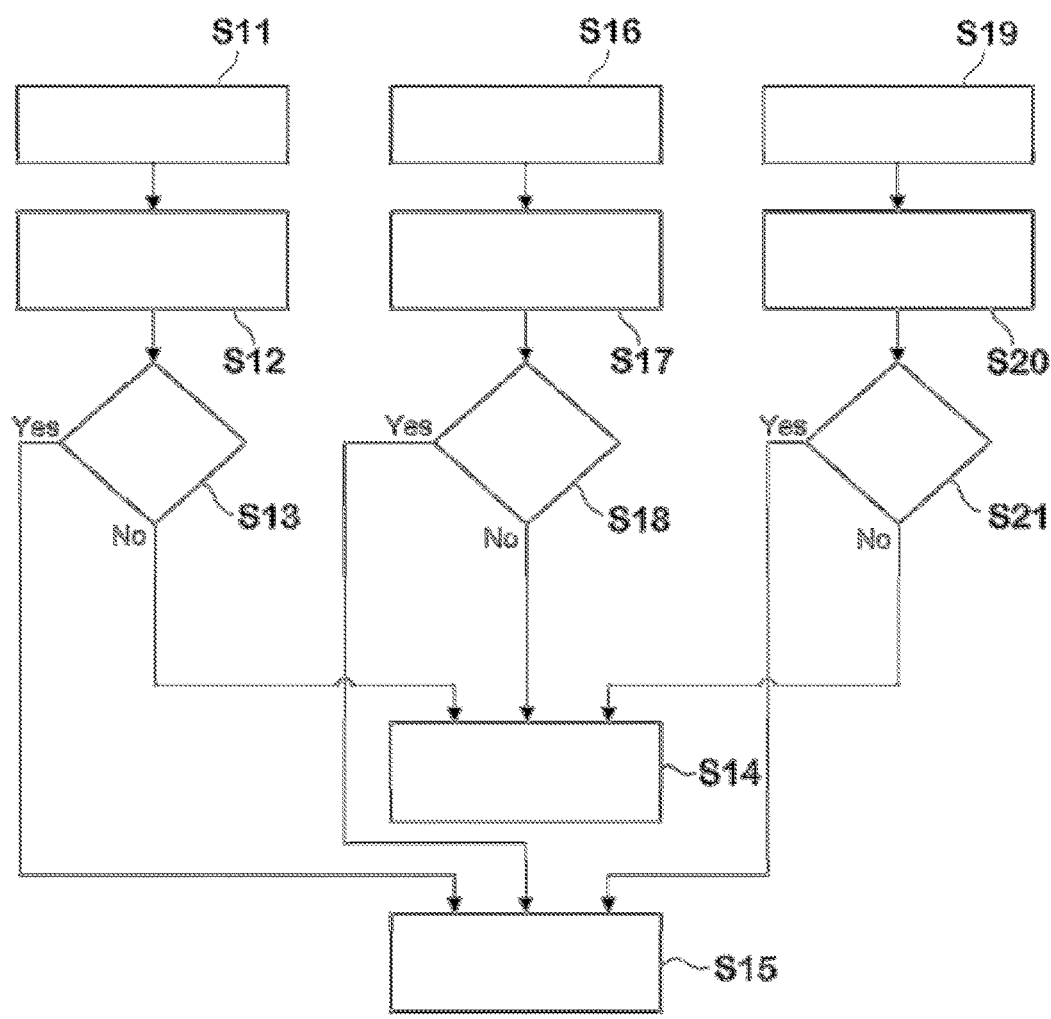
FIG. 3 shows a flow chart explaining the detection of adverse effects on the driver who is seated on the driver's seat of the vehicle.

The detection as to whether the driver is or is not in a state in which he is adversely affected will be explained in more detail now with respect to FIG. 3.

In step S11, the absolute value and duration of the torque applied to the steering wheel by the driver are determined, and in step S12 they are compared with preset absolute and time-based steering wheel torque threshold values. If the steering wheel is not rotated further and is not rotated for a longer time than one of the corresponding threshold values, in step S13 it is assumed that the driver is not in a state S14 in which he is adversely affected. If the steering wheel is rotated further or is rotated for a longer time than one of the corresponding threshold values, this is an indication that the driver is in a state S15 in which he is adversely affected.

In step S16, the rate of change of the actuation and duration of activation operations of the accelerator pedal are determined, and in step S17 they are compared with the corresponding absolute and time-based threshold values. If none of the two abovementioned variables is above the corresponding threshold value, in step S18 it is assumed that the driver is in the state S14 in which he is not adversely affected. If both abovementioned variables are above the corresponding threshold value, this is an indication that the driver is in the state S15 in which he is adversely affected.

In step S19, the rate of change of the actuation and duration of activations of the brake pedal are determined, and in step S20 they are compared with the corresponding absolute and time-based threshold values. If none of the two abovementioned variables is above the corresponding threshold value, in step S21 it is assumed that the driver is in the state S14 in which he is not adversely affected. If both abovementioned variables are above the corresponding threshold value, this is an indication that the driver is in the state S15 in which he is adversely affected.

In step S15, the various abovementioned indices can be OR linked, with the result that the driver is considered to be in the state in which he is adversely affected if the response is Yes in any of the steps S13, S18 and S21. Accordingly, in step S14 an AND logic operation would have to be performed if it was desired to exclude uncertain states. However, these logic operations can also be different, as can the logic operations described above in steps S13, S18 and S21.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a vehicle, comprising:
by a controller,
in response to detecting an emergency braking condition while in a non-autonomous mode, initiate an emergency braking operation, and
in response to detecting an emergency braking condition while in an autonomous mode, initiate an emergency braking operation such that the emergency braking operation is initiated at an earlier point and braking force is built up more slowly than in the non-autonomous mode.

2. The method as claimed in claim 1, wherein the emergency braking operation includes a partial braking phase and a full braking phase, and wherein the partial braking phase is longer in the autonomous mode than in the non-autonomous mode.

3. The method as claimed in claim 1, wherein the emergency braking condition is detected on the basis of indices which are acquired via sensors which sense movements or forces acting on a steering wheel, accelerator pedal, or brake pedal of the vehicle.

4. The method as claimed in claim 3, wherein the emergency braking condition is based on a torque applied to the steering wheel exceeding a preset threshold value or a duration of torque applied to the steering wheel exceeding a time-based threshold value.

5. The method as claimed in claim 3, wherein the emergency braking condition is based on a rate of change or duration of activation operations on an accelerator pedal or on a brake pedal exceeding absolute or time-based preset threshold values for the rate of change of actuation and duration of pedal activation operations.

6. A method for operating a vehicle, comprising:
by a controller, operating an emergency braking system in response to detecting an emergency braking condition based on whether the vehicle is operating in an autonomous driving mode or a non-autonomous driving mode such that a rate at which braking force is developed by the emergency braking system is less in the autonomous driving mode than in the non-autonomous driving mode.

7. The method of claim 6, further comprising operating the emergency braking system such that initiation of the emergency braking system begins sooner after the detecting in the autonomous driving mode than in the non-autonomous driving mode.

8. The method of claim 6, wherein the operating includes a partial braking phase and a full braking phase, and wherein the partial braking phase is longer in the autonomous driving mode than in the non-autonomous driving mode.

9. A method for operating a vehicle, comprising:
by a controller, operating an emergency braking system in response to detecting an emergency braking condition based on whether the vehicle is operating in an autonomous driving mode or a non-autonomous driving mode such that initiation of the emergency braking system begins sooner after the detecting in the autonomous mode than in the non-autonomous driving mode.

10. The method of claim 9, further comprising operating the emergency braking system such that a rate at which braking force is developed by the emergency braking system is less in the autonomous driving mode than in the non-autonomous driving mode.

11. The method of claim 9, wherein the operating includes a partial braking phase and a full braking phase, and wherein the partial braking phase is longer in the autonomous driving mode than in the non-autonomous driving mode.

* * * * *